(12) United States Patent
Skogö

(10) Patent No.: US 10,957,069 B2
(45) Date of Patent: Mar. 23, 2021

(54) HEAD POSE ESTIMATION FROM LOCAL EYE REGION

(71) Applicant: Tobii AB, Danderyd (SE)

(72) Inventor: Mårten Skogö, Stockholm (SE)

(73) Assignee: Tobii AB, Danderyd (SE)

( * ) Notice: Subject to any disclaimer, the term of this patent is extended or adjusted under 35 U.S.C. 154(b) by 104 days.

(21) Appl. No.: 16/146,058

(22) Filed: Sep. 28, 2018

(65) Prior Publication Data
US 2019/0102905 A1 Apr. 4, 2019

Related U.S. Application Data

(60) Provisional application No. 62/566,099, filed on Sep. 29, 2017.

(51) Int. Cl.
*G06K 9/00* (2006.01)
*G06T 7/73* (2017.01)
*G06F 3/01* (2006.01)

(52) U.S. Cl.
CPC ............... *G06T 7/73* (2017.01); *G06F 3/012* (2013.01); *G06K 9/00362* (2013.01); *G06K 9/00597* (2013.01); *G06T 2207/20081* (2013.01); *G06T 2207/30201* (2013.01)

(58) Field of Classification Search
CPC ........... G06K 9/00607; G06K 9/00601; G06K 9/00614; G06K 9/00228; G06K 9/00222; G06K 9/00287; G06K 9/00281; G06K 9/00248; G06T 7/73; G06T 7/408; G06T 2207/20081; G06T 2207/30201; G06F 3/012
See application file for complete search history.

(56) References Cited

U.S. PATENT DOCUMENTS

| | | | | |
|---|---|---|---|---|
| 6,154,559 A | * | 11/2000 | Beardsley | A61B 3/113 340/576 |
| 6,806,898 B1 | * | 10/2004 | Toyama | G06T 5/006 348/14.01 |
| 7,043,056 B2 | * | 5/2006 | Edwards | G06K 9/00248 382/103 |
| 7,284,201 B2 | * | 10/2007 | Cohen-Solal | H04L 29/06027 715/738 |
| 7,742,623 B1 | * | 6/2010 | Moon | G06K 9/00604 382/103 |
| 8,121,356 B2 | * | 2/2012 | Friedman | G06K 9/00604 348/143 |
| 9,141,875 B2 | * | 9/2015 | Wolf | H04N 7/144 |
| 9,274,597 B1 | * | 3/2016 | Karakotsios | G06F 3/0346 |
| 9,563,805 B2 | * | 2/2017 | Cheung | G06F 3/013 |
| 9,965,860 B2 | * | 5/2018 | Nguyen | G06F 3/013 |

(Continued)

OTHER PUBLICATIONS

International Search Report and Written Opinion dated Jan. 11, 2019, in related application No. PCT/US2018/053430, Bell 35 pgs.

(Continued)

*Primary Examiner* — Amir Alavi
(74) *Attorney, Agent, or Firm* — Samuel I. Yamron (57) ABSTRACT

Head pose information may be determined using information describing a fixed gaze and image data corresponding to a user's eyes. The head pose information may be determined in a manner that is disregards facial features with the exception of the user's eyes. The head pose information may be useable to interact with a user device.

11 Claims, 8 Drawing Sheets

(56) References Cited

U.S. PATENT DOCUMENTS

| | | |
|---|---|---|
| 2017/0119298 A1 | 5/2017 | Cheung |
| 2017/0196451 A1 | 7/2017 | Tian |
| 2018/0110613 A1* | 4/2018 | Wortz ............... A61F 2/1613 |
| 2018/0314329 A1* | 11/2018 | Bychkov ............ G06F 3/017 |
| 2019/0102905 A1* | 4/2019 | Skogo ................ G06F 3/012 |

OTHER PUBLICATIONS

Abhyankar Parag et al: "Finding approximate head orientation in non-intrusive environment with single camera", xy 2015 International Conference on Advances in Computer Engineering and Applications, IEEE, Mar. 19, 2015 (Mar. 19, 2015), pp. 478-482.
Yang Heng et al: Information-Based Output Regression Detection, Privileged Conditional Structured Forest for Facial Point IEEE Transactions on Circuits and Systems for Video Technology, Institute of Electrical and Electronics Engineers, US, vol. 25, No. 9, Sep. 1, 2015 (Sep. 1, 2015), pages.

\* cited by examiner

HEAD POSE ESTIMATION FROM LOCAL EYE REGION

CROSS-REFERENCES TO RELATED APPLICATIONS

This application claims the benefit of U.S. Patent Application No. 62/566,099, filed Sep. 29, 2017, the entire disclosure of which is incorporated by reference herein for all purposes.

BACKGROUND

Eye tracking systems have made it possible to interact with a computing device using gaze information (e.g., the location on a display where a user is looking). This information can be used for interaction solely, or in combination with contact-based interaction techniques. An example eye tracking system may include a sensor, an illumination device, and a computing device. In practice, the illumination device illuminates a user's eye, the sensor obtains a high resolution image with an exposure of a windowed sub region of the user's eye (e.g., a region of interest), and the processor uses the high resolution image to determine the gaze information.

Head tracking systems have also made it possible to interact with a computing device using head pose information (e.g., a position and orientation of a user's head with respect to some frame of reference). For example, using the head pose information the user can control actions of a video game character, turn pages in a book, and interact with the computing device in other ways. An example head tracking system may include a sensor (e.g., a global shutter sensor), an illumination device, and a computing device. In practice, the illumination device illuminates the user's head including generic large features of the head (e.g., eyes, ears, nose, mouth, etc.), the sensor obtains a low resolution image of the user's head, and the processor uses the low resolution image corresponding to the large features of the head to determine the head pose information.

Attempts at achieving the function of these two systems in one device have proved challenging. For example, in a single sensor system including a rolling shutter sensor, sacrifices in sensor frame rate may be required to obtain image data within a given time frame, with one being a higher resolution sub window image for eye tracking and the other being a sub sampled lower resolution image for head tracking. In a multi-sensor system (e.g., a global sensor and a shutter sensor), coordination and timing of image capture still proves challenging, with an undesirably increase in power consumption, processing resource consumption, and overall cost.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a sensor device, including: an image sensor. The sensor device also includes a memory configured to store computer-executable instructions; and a processor in communication with the memory and configured to execute the computer-executable instructions to at least access gaze information corresponding to at least one user eye, determine that the at least one user eye is in a gaze state based at least in part on the gaze information, in response determining that the at least one eye is in the gaze state, access image data from the image sensor, the image data corresponding to an eye region that includes the at least one eye in the gaze state. The processor is also configured to determine head pose information based at least in part on the image data corresponding to the eye region, the head pose information defining at least a position of a user head and an orientation of the user head. Other examples of this aspect include corresponding computer systems, apparatus, and computer programs recorded on one or more computer storage devices, each configured to perform the actions of the methods.

Implementations may include one or more of the following features. The sensor device where determining the head pose information is based at least in part on detecting one or more user eye features of the at least one eye based at least in part on the image data. The sensor device where the gaze state corresponds to at least one of a gaze point of the at least one eye or a gaze vector of the at least one eye. The sensor device where determining the head pose information includes using an artificial intelligence technique to evaluate the image data corresponding to the eye region. The sensor device where the artificial intelligence technique includes a machine learning technique based at least in part on n feature vector that corresponds to eye features. The sensor device where the artificial intelligence technique includes deep learning technique. The sensor device where determining the head pose information based at least in part on the image data corresponding to the eye region includes determining the head pose information based at least in part a particular portion of the image data that excludes a user nose tip and user ears. The sensor device where: the eye region, for the at least one eye, includes eye features including one or more of an iris, a pupil, a sclera, an upper eyelid, a lower eyelid, an inner canthus, or an outer canthus. The processor may also be configured to determine the head pose information is further based at least in part on a portion of the image data that corresponds to the eye features. The sensor device where: the image data is first image data; and the processor is further configured to access the computer-executable instructions to at least, before accessing the gaze information, access second image data from the image sensor, the second image data corresponding to the eye region. The processor may also be configure to determine the gaze information based at least in part on the second image data. Implementations of the described techniques may include hardware, a method or process, or computer software on a computer-accessible medium.

One general aspect includes a computer-implemented method, including: accessing an indication that at least one eye is in a gaze state. The computer-implemented method also includes in response to accessing the indication, accessing image data corresponding to an eye region that includes the at least one eye in the gaze state. The computer-implemented method also includes determining head pose information based at least in part on the image data corresponding to the eye region. Other examples of this aspect include corresponding computer systems, apparatus, and computer programs recorded on one or more computer storage devices, each configured to perform the actions of the methods.

Implementations may include one or more of the following features. The computer-implemented method where the head pose information defines at least a head position and a head orientation. The computer-implemented method where the head position corresponds to a spatial position within a first three-dimensional space and the head orientation corresponds to a spatial orientation within a second three-dimensional space. The computer-implemented method further including navigating on a user device based at least in part on the head pose information. The computer-implemented method further including, prior to accessing the indication that the at least one eye is in the gaze state: accessing other image data corresponding to the eye region. The computer-implemented method may also include determining gaze information corresponding to the at least one eye based on least in part on the other image data. The computer-implemented method may also include determining the indication that the at least one eye is in the gaze state based at least in part on the gaze information. The computer-implemented method where determining the head pose information is based at least in part on detecting one or more eye features of the at least one eye based at least in part on the image data, the one or more eye features including one or more of an iris, a pupil, a sclera, an upper eyelid, a lower eyelid, an inner canthus, or an outer canthus. The computer-implemented method where determining the head pose information includes: determining a yaw component of a head pose based at least in part on an inner canthus and an outer canthus of the at least one eye represented by the image data. The computer-implemented method may also include determining a roll component of the head pose based at least in part on an angle of a line extended between the inner canthus and the outer canthus of the at least one eye. The computer-implemented method may also include determining a pitch component of the head pose based at least in part on one or more of an upper eyelid or a lower eyelid of the at least one eye. Implementations of the described techniques may include hardware, a method or process, or computer software on a computer-accessible medium.

One general aspect includes one or more non-transitory computer-readable storage devices storing computer-executable instructions that, when executed by one or more computer systems, cause the one or more computer systems to perform operations including: accessing an indication that at least one eye is in a gaze state. The one or more non-transitory computer-readable storage devices also includes in response to accessing the indication, accessing image data corresponding to an eye region that includes the at least one eye in the gaze state. The one or more non-transitory computer-readable storage devices also includes determining head pose information based at least in part on the image data corresponding to the eye region. Other examples of this aspect include corresponding computer systems, apparatus, and computer programs recorded on one or more computer storage devices, each configured to perform the actions of the methods.

Implementations may include one or more of the following features. The one or more non-transitory computer-readable storage devices where determining the head pose information is based at least in part on detecting one or more eye features of the at least one eye based at least in part on the image data. The one or more non-transitory computer-readable storage devices where the image data excludes data corresponding to facial features disposed outside the eye region. The one or more non-transitory computer-readable storage devices where determining the head pose information includes using an artificial intelligence technique to evaluate the image data corresponding to the eye region to identify a head position and a head orientation. Implementations of the described techniques may include hardware, a method or process, or computer software on a computer-accessible medium.

DETAILED DESCRIPTION

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples described herein are directed to methods, systems, devices, and techniques relating to determining head pose information in a manner that is dependent on eye tracking information. For example, based on a determined gaze point of a user (e.g., information describing a point in space where the user is looking) and image data corresponding to features of the user's eye, a position and orientation of the user's head can be determined. In some examples, the position and orientation are determined using the same image data that was used to determine the gaze point. Because the focus is on the eyes for both types of tracking, a single sensor can be used to collect image data. This sensor can be optimized to collect image data at an optimized frame rate without needing to adjust the frame rate to account for multiple capture events (e.g., a first image for gaze detection and a second image for head pose detection). A processor outputs the image data at an optimized resolution without needing to perform image bending or other processor-intensive resolution alterations. There is also no requirement to coordinate timing of multiple sensor collection events or to use multiple sensors because the same data will be used for both types of tracking. And even if different data is used for both types of tracking, the fact that the data is collected at the same frame rate and processed at the same or similar resolution reduces lag time and improves overall functioning of non-contact interaction systems.

In a particular example, a sensing device is provided that includes a sensor, an illuminator, and a processor. The sensing device may be included in a user device such as a mobile phone or tablet device. The sensor is positioned in the user device so as to capture image data of eyes of a user (e.g., a forward-facing camera). To optimize resolution, frame rate, power consumption, and processing demands, the image data may correspond specifically to the eyes of the user, without including other features of the head of the user. Of course, these other features may be represented by the image data, but the techniques described herein relating to determining gaze information and head pose information may include disregarding extraneous image data unrelated to the eyes of the user. In any event, the image data may be processed to determine gaze information about the eyes of the user. The gaze information may indicate a gaze point of the eyes of the user and/or a gaze vector (e.g., a direction of the eyes of the user). Once known, the gaze information may be used in connection with the image data to determine head pose information, head position, and/or eye position. This may include processing the image data to identify associations between where the user is looking and relative positions of features of the eyes such as pupils, sclera, eyelids, inner and outer canthi, and other similar features. In some examples, the image data is used to determine the head pose information, head position, and/or eye position without relying on the gaze information. For example, determining the head pose information, head position, and/or eye position may be achieved using artificial intelligence techniques including those in the classes of machine learning, deep learning, and other similar classes. In a particular example, the image data corresponding to the eye region is input into a deep convolutional neural network (deep CNN) which has been trained on annotated eye region images captured with known gaze position, known head position, and known head pose. Output from the deep CNN, in this example, can include gaze information, head pose information, head position, and/or eye position.

Figure 1:
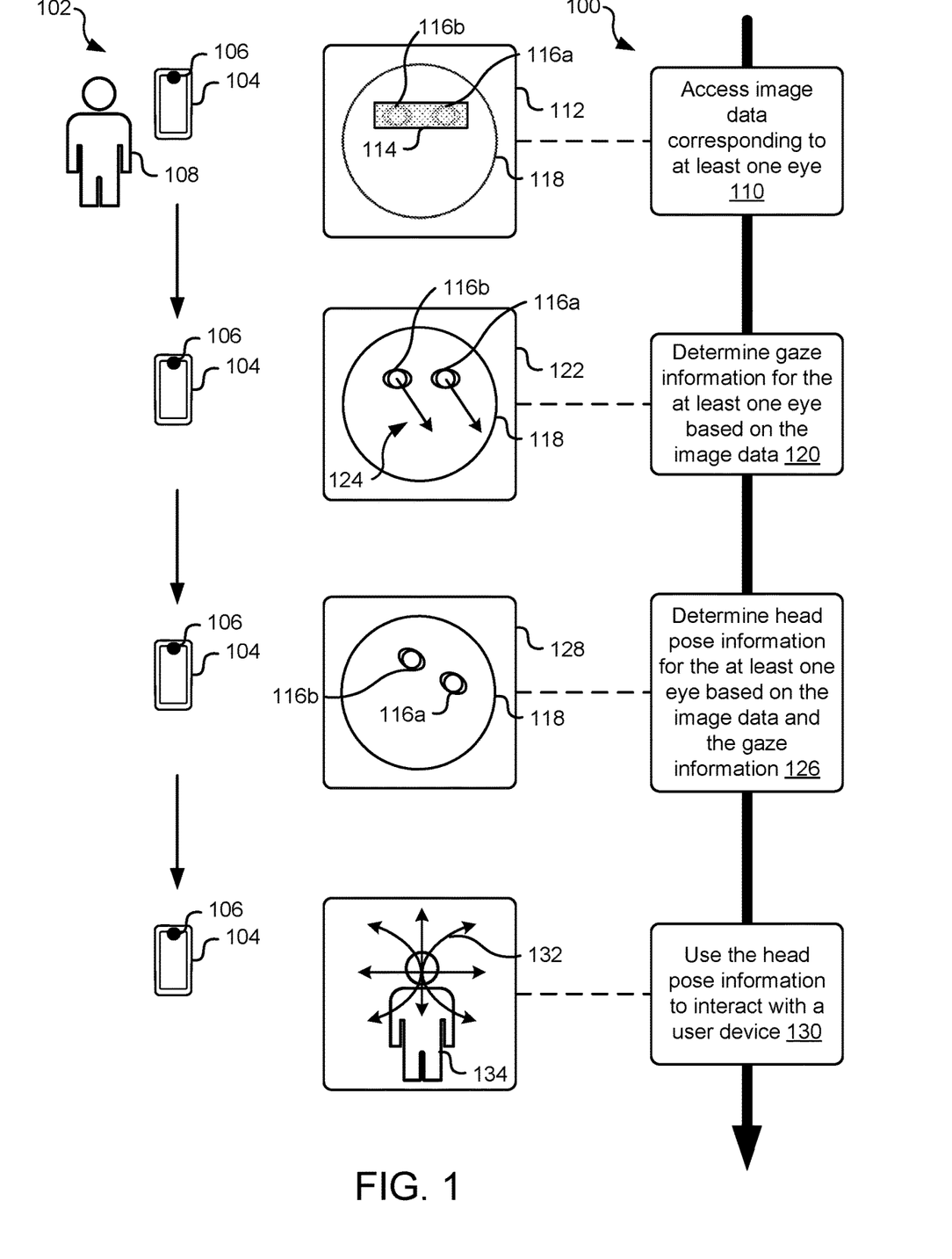
FIG. 1 illustrates a block diagram and a flowchart for providing non-contact interaction with a user device using head pose information and eye tracking information, according to at least one example.

Turning now the figures, FIG. 1 illustrates a block diagram 102 and a flowchart showing a process 100 for providing non-contact interaction with a user device using head pose information and eye tracking information, according to at least one example. The diagram 102 includes a user device 104 that includes a sensor device 106 (e.g., a package including one or more sensors, one or more illuminators, one or more memory modules, and one or more processors, and other suitable components). The user device 104 is operated by a user 108. In some examples, the user device 104 is configured to perform the process 100 described herein.

The user device 104 is positionable such that the sensor device 106 can gather sensor data (e.g., image data) corresponding to the user's 108 eyes. For example, the user device 104 may be a handheld mobile device such as a smartphone and the sensor device 106 may be positioned at an exterior surface of the handheld mobile device. In this manner, the sensor device 106 may face the user 108 as the user 108 interacts with the user device 104.

In some examples, the user device 104 is fixed or otherwise immobile. In this example, the sensor device 106 may be mounted to the user device 104 in a manner that enables viewing of the user 108 who operates the user device 104.

The process 100 may be performed, at least in part, by the user device 104 and/or the sensor device 106. In some examples, at least a portion of the process 100 is performed by a remote service (e.g., a server computing device in network communication with the user device 104). For example, the user device 104 may collect sensor data, upload the sensor data to the remote service, and receive gaze information and/or head pose information.

FIGS. 1, 10, 11, and 12 illustrate example flow diagrams showing processes 100, 1000, 1100, and 1200, according to at least a few examples. These processes, and any other processes described herein, are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer-readable storage medium, for example, in the form of a computer program including a plurality of instructions executable by one or more processors.

The process 100 may be begin at 110 by accessing image data 112 corresponding to an eye region 114 of head 118 of the user 108. Within the eye region 114 may include image data 112 that represents at least one eye 116a and/or both eyes 116. In some examples, the image data 112 may have been collected by the sensor device 106 viewing the head 118. The image data 112 may, in some examples, correspond to both eyes 116a, 116b of the user 108. As described herein, the image data 112 may originally be collected to correspond to the eye region 114 and/or may be trimmed, filtered, or otherwise adjusted to correspond to the eye region 114. collected to include just may include accessing image data collected by the sensor device 106. For example, an image of the head 118 may be collected and features other than the eyes 116 may be filtered out of the image.

At 120, the process 100 may include determining gaze information 122 for the at least one eye 116a based on the image data 112. In some examples, the gaze information 122 may correspond to gaze points and/or gaze vectors, represented by 124, corresponding to the eyes 116. Thus, the gaze information 122 may represent a point and/or direction at which the user 108 is looking.

At 126, the process 100 may include determine head pose information 128 for the at least one eye 116a based on the image data 112 and the gaze information 122. In some examples, the head pose information 128 may constitute an estimate relating to a position and/or orientation of the head 118 within six dimensions (e.g., three position dimensions and three orientation dimensions). In the illustrated example, the head 118 has been tilted to the side. Of course, as described herein, other changes to the position and orientation of the head 118 may be determined using the techniques described herein. This is an example of a head pose that has been adjusted from an initial state (e.g., an initial position and an initial orientation). The initial position may be an absolute state (e.g., indicated some predefined position and orientation for the head 118) or may be a relative state (e.g., indicated as a last known position and orientation for the head 118).

At 130, the process 100 may include using the head pose information 128 to interact with a user device (e.g., the user device 104). In some examples, the head pose information 128 may be used input to control the user device 104. For example, the head pose information 128 may be translated into commands 132 to control movements of a character 134 (e.g., in a virtual world, in an augmented world, etc.), control a vehicle, normalize images for authentication purposes (e.g., knowing how a head has been rotated off-center may be enable facial recognition using images captured from off-center), calibrate regular head posing algorithms that rely on identifying facial features other than or in addition to eyes.

Figure 2:
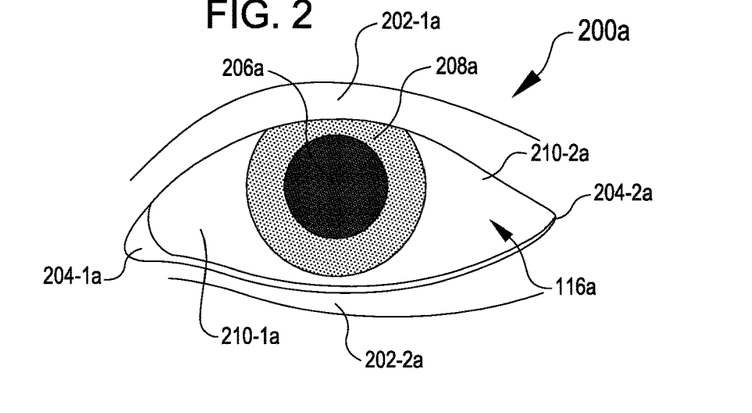
FIG. 2 illustrates an example of an image of an eye area, according to at least one example.

FIG. 2 illustrates an example image of an eye area 200*a*, according to at least one example. The eye area 200*a* includes the eye 116*a*. The eye area 200*a* and the eye 116*a* may be defined with respect to a plurality of eye features. For example, the eye 116*a* is disposed between an upper eyelid 202-1*a* and a lower eyelid 202-2*a*. The upper eyelid 202-1*a* and the lower eyelid 202-2*a* meet at an inner canthus 204-1*a* and an outer canthus 204-2*a*. Thus, the canthi 204-1*a*, 204-2*a* represent the "corners" of the eye 116*a*. The eye 116*a* also includes a pupil 206*a*, an iris 208*a*, and a sclera 210*a* (e.g., an inner sclera part 210-1*a* and an sclera outer part 210-2*a*). In some examples, the techniques described herein estimate head pose based on how the eye 116 is positioned with respect the eyelids 202 given some fixed gaze of the user.

Figure 3:
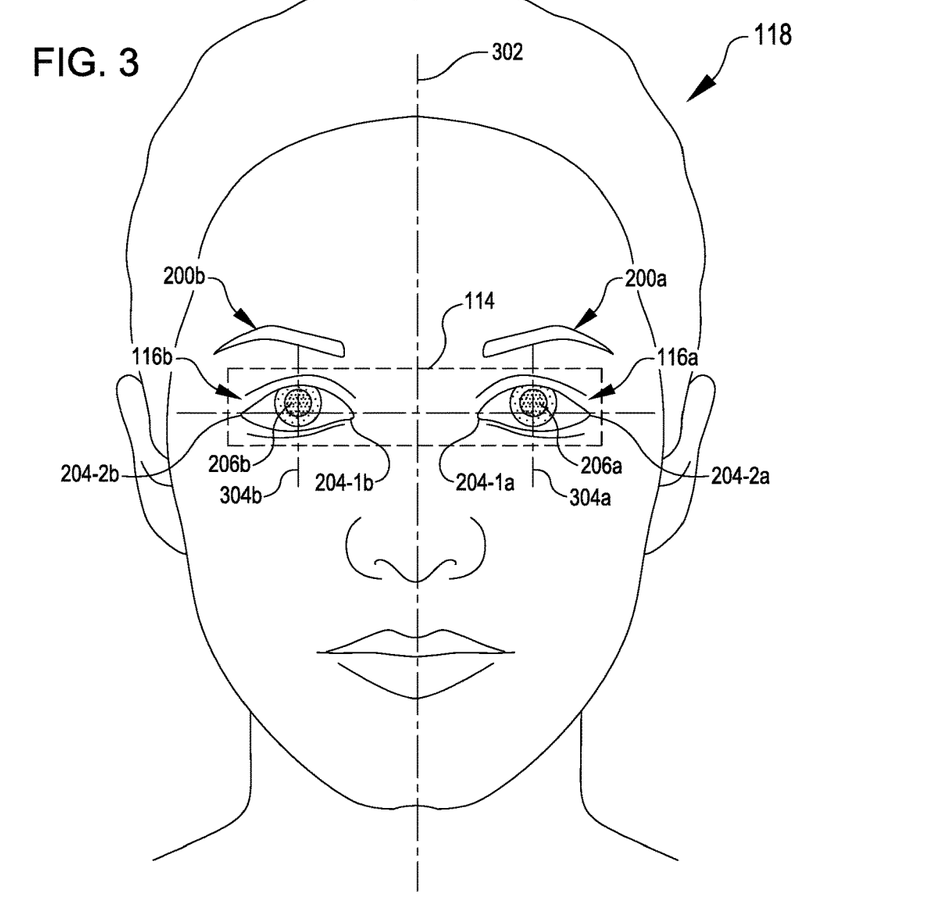
FIGS. 3-6 illustrates an example head in various head poses, according to various examples.

FIG. 3 illustrates the head 118-3 in an initial, neutral state, according to at least one example. The head 118-3 may be defined by a head axes 302, a few axis of which are illustrated. The head axes 302 are for illustrative purposes, but generally a complete set of head axes 302 may be capable of graphing a head pose (e.g., a head position and a head orientation) within six degrees of movement within a three-dimensional space. A first set of the head axes 302 may be used to define changes in the head position (e.g., forward/backward, up/down, and left/right). A second set of head axes 302 may be used to define change in the head orientation (e.g., yaw, pitch, and roll). Changes in the head pose may be measured with respect to the initial, neutral state illustrated in FIG. 3.

The eye areas 200*a*, 200*b* may be defined by eye area axes 304*a*, 304*b*. Each eye area axes 304 may include a vertical axis and a horizontal axis. The vertical axis may extend vertically through the pupil 206 (e.g., at a center point). The horizontal axis may be aligned perpendicularly to the vertical axis and may extend through one or both of the canthi 204. For example, depending on the characteristics of the eye area 200, the canthi 204 may lie in a parallel plane with each other, or may be offset one from each other. In any event, the eye area axes 304 may define a frame of reference from which changes in the eye areas 200 may be recognized. In some examples, the eye area axes 304 may remain fixed at the positions shown in FIG. 3 and the eyes 116 and the eye features may move with respect to the eye area axes 304. This may be because the techniques described herein may be dependent on a fixed gaze of the eyes, e.g., the eyes 116 remaining fixed on some gaze point.

FIG. 3 also illustrates the eye region 114. While illustrated as having a rectangular shape enclosing both eyes 116 and/or eye areas 200, the eye region 114 may, in some examples, have a different shape and may enclose a single eye 116 or a single eye area 200. In some examples, the eye region 114 represents image data or other sensor data that corresponds to an area of the head 118 being used to generate the gaze information and/or the head pose information. For example, image data that is captured within the eye region 114 may correspond to and/or otherwise represent both eye areas 200, a portion of a nose (e.g., a nose bridge), and other portions of the head 118-3. In some examples, other image data, which may be collected at the same time or a later time than when the image data in the eye region 114 is collected, that corresponds to and/or otherwise represents a larger portion of the head 118-3. For example, the other image data may represent the point of the nose, eyebrows, mouth, ears, hairline, chin, cheeks, and other features of the head 118-3. In some examples, this other image data may be used to implement conventional head pose determination techniques that rely on facial features in addition to the eyes 116.

Figure 4:
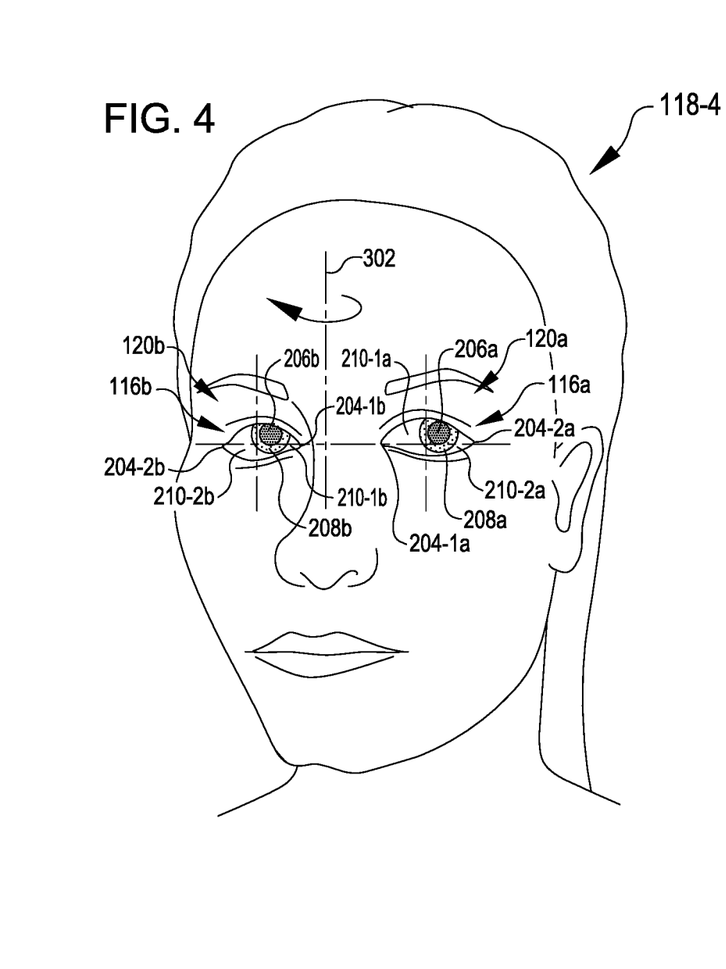
Figure 5:
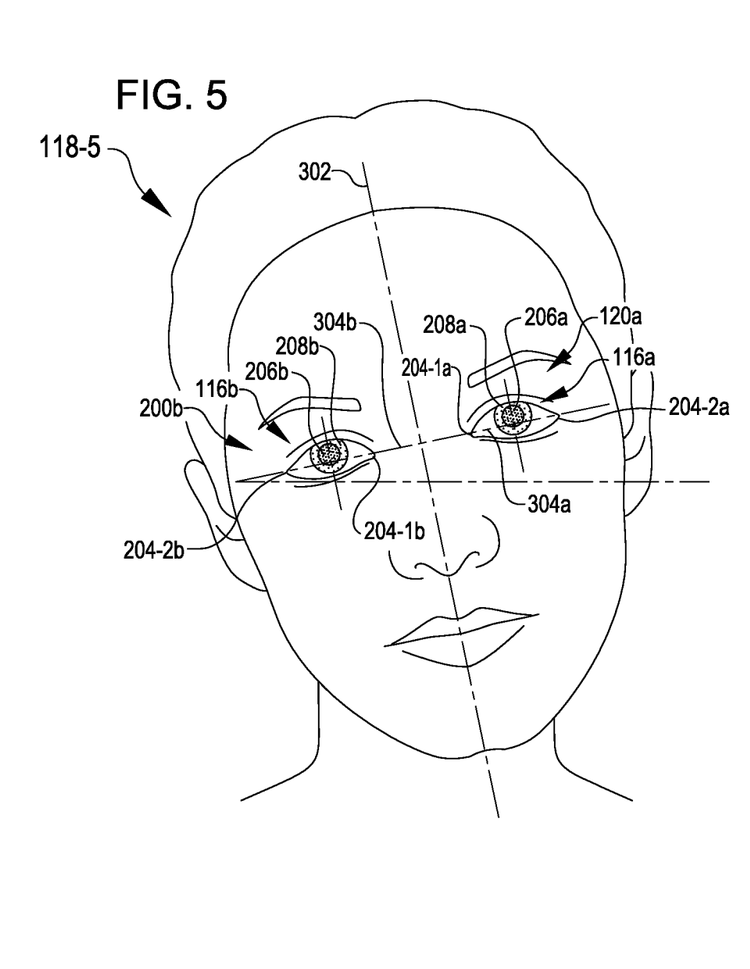
Figure 6:
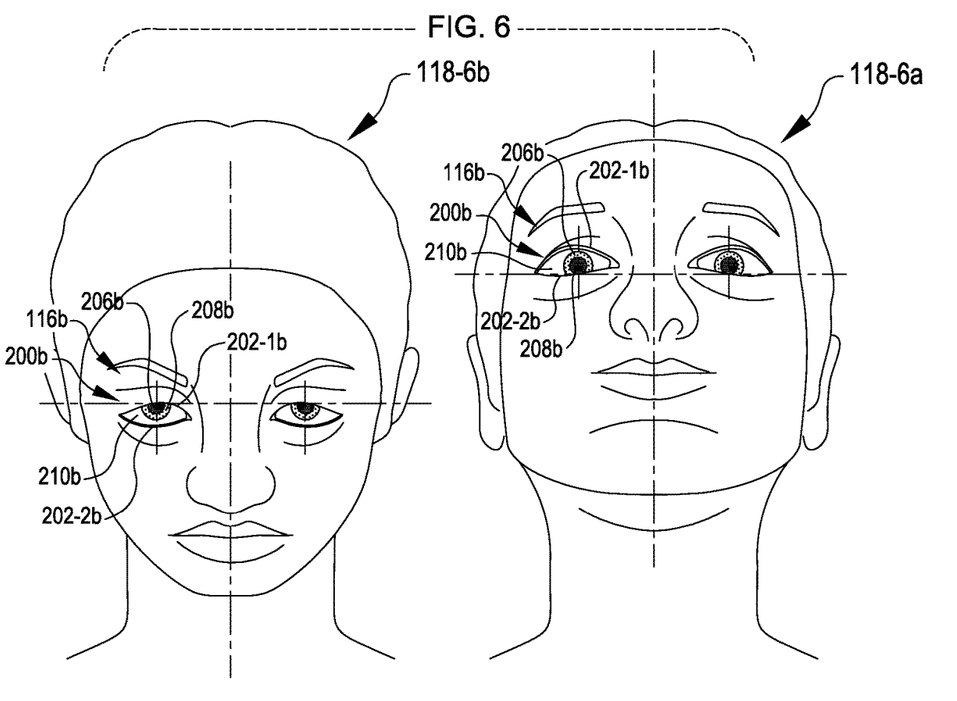

FIGS. 4, 5, and 6 illustrate example views of the head 118 in various head poses.

Determining the head pose information may include processing the image data corresponding to the eye region 114 in a captured view to identify characteristics of the eye features that are indicative of certain poses. Head position may be determined based on a relative location of the eyes 116 with respect to some frame of reference. Head orientation may include right and left rotation (e.g., FIG. 4), right and left tilting (e.g., FIG. 5), and forward and backward leaning (e.g., FIG. 6).

In some examples, image processing, including object detection techniques, may be used to process image data to identify eye features and characteristics of the identified eye features. For example, the size, shape, and location of eye features can be identified. Data that represents these characteristics of the eye features in an example head pose can then compared with other data that represents these characteristics of the eye features in a neutral pose to identify the difference. This difference can again be used to predict head pose. For example, an area of the sclera of an eye may be computed and used to determine head pose by comparing with an area of the sclera in a neutral pose.

In some examples, artificial intelligence techniques may be used to predict, given certain image data about the eyes 116, a head pose. Examples of artificial intelligence techniques that may be suitable include machine learning (e.g., decision tree learning, association rule learning, artificial neural networks, deep learning, inductive logic programming, clustering, Bayesian networks, reinforcement learning, and any other suitable technique). The artificial intelligence models, whether machine learning models or otherwise, may be hosted on the user device 106, a service provider computer that is remote from the user device, a sensing device that is separate from the user device (e.g., a wearable headset or an eye-tracking system for use with a desktop or laptop computer), and any combination of the foregoing.

The data used to train the machine learning models, whether traditional machine learning and/or deep learning systems, may include annotated eye region images captured with known gaze positions (e.g., where a user was looking on a screen when the image was captured), known head pose (e.g., an orientation of the head when the image was captured), and head position (e.g., a position of the head when the image was captured). Example head orientations may include neutral, rotate left, rotate right, tilt left, tilt right, lean forward, lean backward, and any suitable combination of the foregoing. In some examples, there may many different degrees of orientations such as a rotate left on a scale of 1-5, with five being completely rotated and one being only slightly rotated beyond the neutral position. Similar degrees of orientation change can be annotated for each of the different orientation changes. Depending on the type of data used to train the models, the techniques described herein may identify head position, eye position, gaze point, gaze direction, and head pose. In some examples, a feature vectors identifying the eye features may be used as input to the machine learning models. In this manner, the models may classify the features in the feature vectors. In some examples, raw image data and/or image file may be input in the deep learning systems (e.g., images including one eye or two eyes). Based on the annotated training data set and the image data, the deep learning system may determine head position, eye position, gaze point, gaze direction, and head pose.

Turning now to FIG. 4, this figure illustrates the head 118-4. The head 118-4 corresponds to a right rotation of the head 118-4. The right rotation may be characterized as a right rotation about a vertical axis of the head axes 302 resulting in a change in yaw. A left rotation of the head 118 may result in a mirrored view of the eyes 116. The left rotation may be characterized as left rotation about the vertical axis of the head axes 302 resulting in an opposite change in yaw.

In some examples, with the gaze of the eyes 116 fixed on a gaze point, features of the eye areas 200 may appear different than in the head 118-3. In particular, in the eye 116a, the visible portion of the sclera part 210-1a has increased and the visible portion of the sclera part 210-2a has decreased. Similarly, with respect to the eye 116b, the visible portion of the sclera part 210-1b has decreased and the visible portion of the sclera part 210-1a has increased. The pupils 206 and the irises 208 also appear to have moved into upper right quadrants of the eye area axes 304. For example, the pupil 206a and the iris 208a are now positioned closer to the outer canthus 204-2a. Likewise the pupil 206b and the iris 208b are now positioned closer to the inner canthus 204-2b. Image data corresponding to the eyes 116 may be processed to identify the characteristics of the eye features described herein.

Turning now to FIG. 5, this figure illustrates the head 118-5. The head 118-5 corresponds to a right tilting of the head 118-5. The right tilting may be characterized as a right tilting with respect to a horizontal axis of the head axes 302 resulting in a change in roll. A left tilting of the head 118-5 may result in a mirrored view of the eyes 116. The left tilting may be characterized as left tilting with respect to the horizontal axis of the head axes 302 resulting in an opposite change in roll.

In some examples, with the gaze of the eyes 116 fixed on a gaze point, features of the eye areas 200 may appear different than in the heads 118-3, 118-4. In particular, the horizontal axis of the eye axis 304a has been rotated such that it is no longer horizontal. In some examples, a line may be superimposed on the eye 116a that extends between the canthi 204-1a, 204-2a. When a view of the eye 116a is captured in which the line has a slope value that is different from the original slope value (e.g., 0, or some other value depending on the characteristics of the canthi 204). When the slope value is a positive value, it may be predicted that the head 118 has been tilted in a first direction. When the slope value is a negative value, it may be predicted that the head 118 has been tilted in a second direction. In FIG. 5, the position of the eyes 116 in the head 118-5 is quite similar to the positions of the eyes 116 in the head 118-3. Thus, rotation and leaning may be ruled out as possible head orientations.

Turning now to FIG. 6, this figure illustrates the heads 118-6a, 118-6b. The head 118-6a corresponds to a backward leaning of the head 118-6a. The backward leaning may be characterized as a change in pitch. The head 118-6b corresponds to a forward leaning of the head 118-6b. The forward leaning may be characterized as a change in pitch.

In some examples, with the gaze of the eyes 116 fixed on a gaze point, features of the eye areas 200 may appear different than in the heads 118-3, 118-4, and 118-5. In particular, as discussed with reference to the eye area 200b in the head 118-6b, the lower eyelid 202-2b occludes a portion of the sclera 210b, a portion of the iris 208b, and a portion of the pupil 206b. The upper eyelid 202-1b is retracted away from an upper portion of the sclera 210b. The characteristics of these eye features may be compared characteristics of the eye features in other views of the head 118 to determine that this view represents a backward leaning of the head 118-6b.

In the head 118-6a, the upper eyelid 202-1b partially occludes a more significant portion of the pupil 206b and a more significant portion of the iris 208b as compared to the head 118-6b. This may be because the upper eyelid 202-1b curls over the eye 116b when the head 118-6b leans forward. Also in the head 118-6b, a continuous lower portion of the sclera 210b is visible in the eye 116b. The characteristics of these eye features may be compared characteristics of the eye features in other views of the head 118 to determine that this view represents a forward leaning of the head 118-6a.

Figure 7:
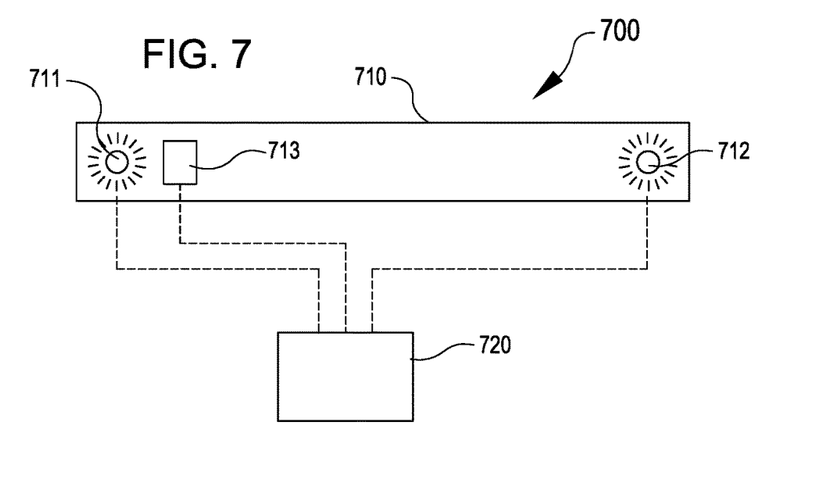
FIG. 7 illustrates an eye tacking system, according to at least one example.

FIG. 7 illustrates an eye tacking system 700 (which may also be referred to as a gaze tracking system), according to an example. The system 700 is an example of the sensor device 106 described herein. The system 700 includes illuminators 711 and 712 for illuminating the eyes of a user, and a light sensor 713 for capturing images of the eyes of the user. The illuminators 711 and 712 may for example be light emitting diodes emitting light in the infrared frequency band, or in the near infrared frequency band. The light sensor 713 may for example be a camera, such as a rolling shutter complementary metal oxide semiconductor (CMOS) camera or a charged coupled device (CCD) camera.

A first illuminator 711 is arranged coaxially with (or close to) the light sensor 713 so that the light sensor 713 may capture bright pupil images of the user's eyes. Due to the coaxial arrangement of the first illuminator 711 and the light sensor 713, light reflected from the retina of an eye returns back out through the pupil towards the light sensor 713, so that the pupil appears brighter than the iris surrounding it in images where the first illuminator 711 illuminates the eye. A second illuminator 712 is arranged non-coaxially with (or further away from) the light sensor 713 for capturing dark pupil images. Due to the non-coaxial arrangement of the second illuminator 712 and the light sensor 713, light reflected from the retina of an eye does not reach the light sensor 713 and the pupil appears darker than the iris surrounding it in images where the second illuminator 712 illuminates the eye. The illuminators 711 and 712 may for example take turns to illuminate the eye, so that every second image is a bright pupil image, and every second image is a dark pupil image.

The eye tracking system 700 also includes circuitry 720 (for example including one or more processors) for processing the images captured by the light sensor 713. The circuitry 720 may for example be connected to the light sensor 713 and the illuminators 711 and 712 via a wired or a wireless connection. In another example, circuitry 720 in the form of one or more processors may be provided in one or more stacked layers below the light sensitive surface of the light sensor 713.

Figure 8:
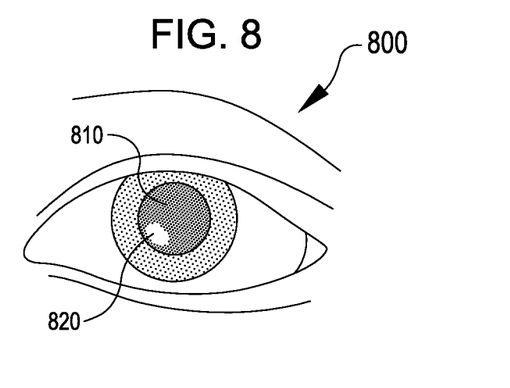
FIG. 8 illustrates an example image of an eye captured using the eye tracking system of FIG. 7, according to at least one example.

FIG. 8 illustrates an example of an image of an eye 800, captured by the light sensor 713. The circuitry 720, which may include one or more processors, may for example employ image processing (such as digital image processing) for extracting features in the image. The circuitry 720 may for example employ pupil center cornea reflection (PCCR) eye tracking to determine where the eye 800 is looking. In PCCR eye tracking, the circuitry 720 estimates the position of the center of the pupil 810 and the position of the center of a glint 820 at the eye 800. The glint 820 is caused by reflection of light from one of the illuminators 711 and 712. The circuitry 720 calculates where the user is in space using the glint 820 and where the user's eye 800 is pointing using the pupil 810. Since there is typically an offset between the optical center of the eye 800 and the fovea, the circuitry 720 performs calibration of the fovea offset to be able to determine where the user is looking. The gaze directions obtained from the left eye and from the right eye may then be combined to form a combined estimated gaze direction (or viewing direction). As will be described below, many different factors may affect how the gaze directions for the left and right eyes should be weighted relative to each other when forming this combination.

In the example described with reference to FIG. 7, the illuminators 711 and 712 are arranged in an eye tracking module 710 placed below a display watched by the user. This arrangement serves only as an example. It will be appreciated that more or less any number of illuminators and light sensors may be employed for eye tracking, and that such illuminators and light sensors may be distributed in many different ways relative to displays watched by the user. It will be appreciated that the eye tracking scheme described in the present disclosure may for example be employed for remote eye tracking (for example in a personal computer, a smart phone, or integrated in a vehicle) or for wearable eye tracking (such as in virtual reality glasses or augmented reality glasses).

Figure 9:
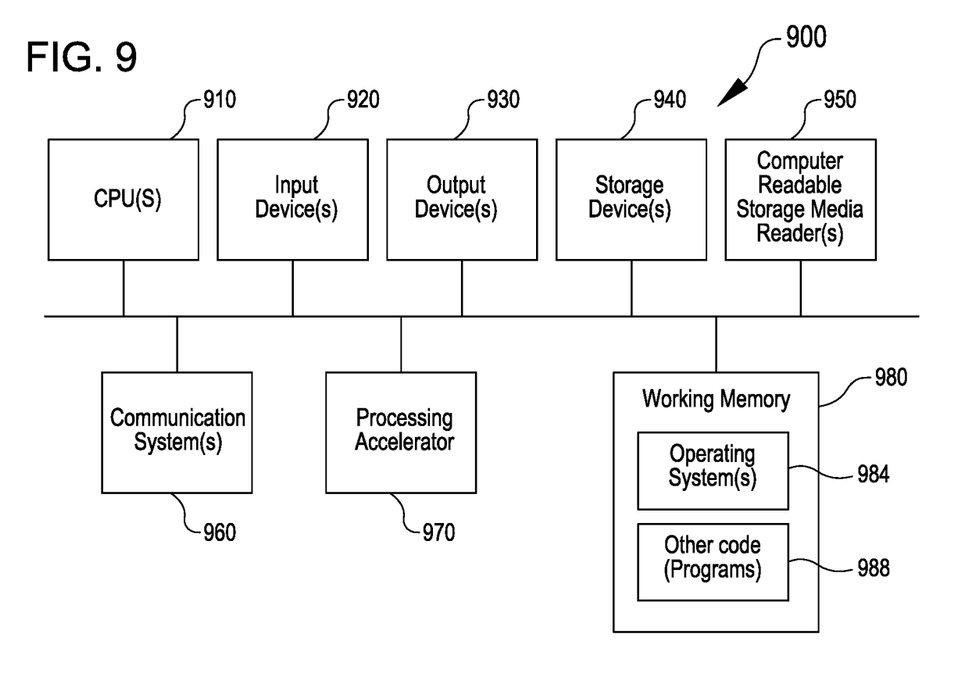
FIG. 9 illustrates a block diagram illustrating a specialized computer system for implanting the techniques described herein, according to at least one example.

FIG. 9 illustrates a block diagram illustrating a specialized computer system 900 in which examples of the present disclosure may be implemented. This example illustrates specialized computer system 900 such as may be used, in whole, in part, or with various modifications, to provide the functions of components described herein.

Specialized computer system 900 is shown comprising hardware elements that may be electrically coupled via a bus 990. The hardware elements may include one or more central processing units 910, one or more input devices 920 (e.g., a mouse, a keyboard, eye tracking device, etc.), and one or more output devices 930 (e.g., a display device, a printer, etc.). Specialized computer system 900 may also include one or more storage device 940. By way of example, storage device(s) 940 may be disk drives, optical storage devices, solid-state storage device such as a random access memory ("RAM") and/or a read-only memory ("ROM"), which can be programmable, flash-updateable and/or the like.

Specialized computer system 900 may additionally include a computer-readable storage media reader 950, a communications system 960 (e.g., a modem, a network card (wireless or wired), an infra-red communication device, Bluetooth™ device, cellular communication device, etc.), and working memory 980, which may include RAM and ROM devices as described above. In some examples, specialized computer system 900 may also include a processing acceleration unit 970, which can include a digital signal processor, a special-purpose processor and/or the like.

Computer-readable storage media reader 950 can further be connected to a computer-readable storage medium, together (and, optionally, in combination with storage device(s) 940) comprehensively representing remote, local, fixed, and/or removable storage devices plus storage media for temporarily and/or more permanently containing computer-readable information. Communications system 960 may permit data to be exchanged with a network, system, computer and/or other component described above.

Specialized computer system 900 may also include software elements, shown as being currently located within a working memory 980, including an operating system 984 and/or other code 988. It should be appreciated that alternate examples of specialized computer system 900 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of specialized computer system 900 may include code 988 for implementing any or all of the function of the various elements of the architecture as described herein. For example, software, stored on and/or executed by a specialized computer system such as specialized computer system 900, can provide the functions of components of the disclosure such as those discussed above. Methods implementable by software on some of these components have been discussed above in more detail.

Figure 10:
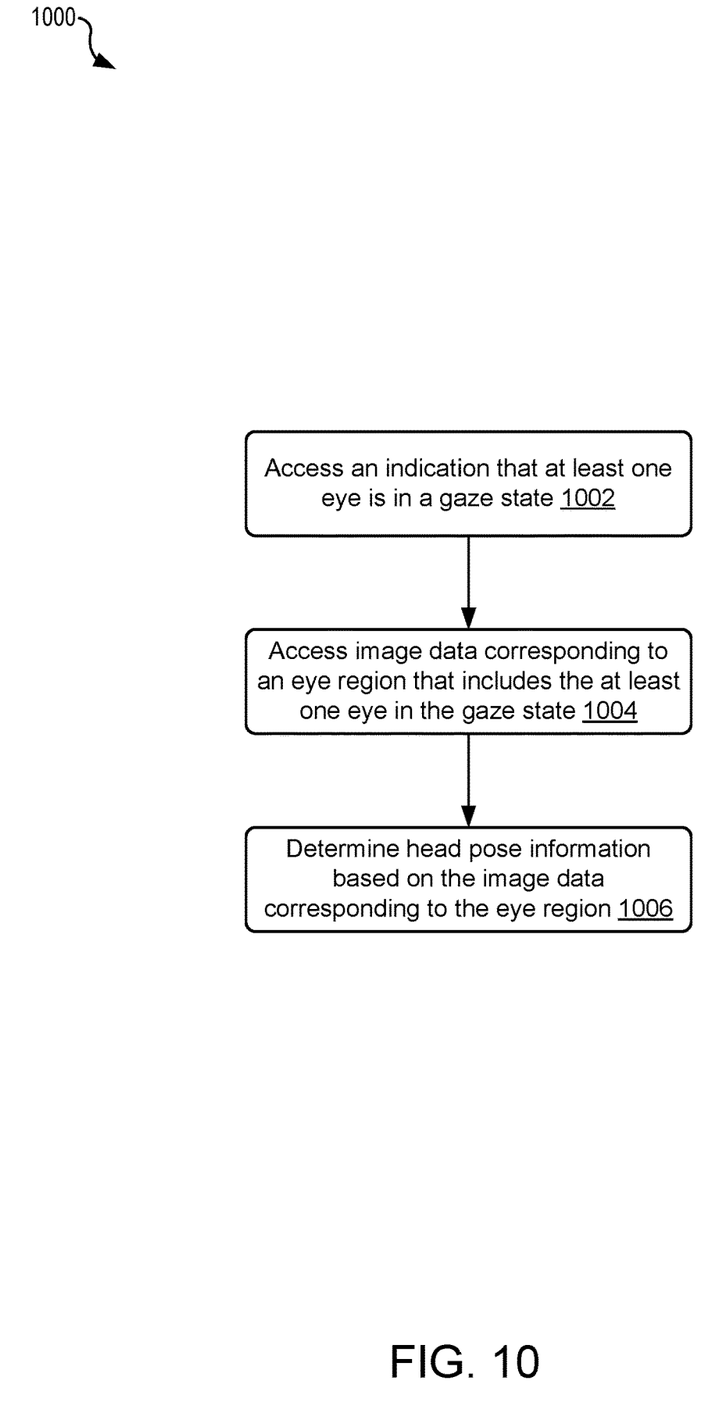
FIG. 10 illustrates an example flow diagram showing the process for determining head pose information, according to at least one example.

FIG. 10 illustrates an example flow diagram showing the process 1000 for determining head pose information, according to at least one example. The process 1000 may be performed by the user device 104, the sensor device 106, and/or the eye tracking system 700.

The process 1000 may begin at 1002 by accessing an indication that the at least one eye is in a gaze state. The gaze state may represent that the at least one eye is fixed on a gaze point, which can be defined using a gaze vector.

At 1004, the process 1000 may include accessing image data corresponding to an eye region that includes the at least one eye in the gaze state. This may be performed in response to accessing the indication.

At 1006, the process 1000 may include determining head pose information based at least in part on the image data corresponding to the eye region. This may include, in some examples, determining the head pose information based at least in part on detecting one or more eye features of the at least one eye based at least in part on the image data. The one or more eye features may include one or more of an iris, a pupil, a sclera, an upper eyelid, a lower eyelid, an inner canthus, or an outer canthus.

In some examples, the head pose information may define at least a head position and a head orientation. In some examples, the head position may correspond to a spatial position within a first three-dimensional space and the head orientation may correspond to a spatial orientation within a second three-dimensional space.

In some examples, determining the head pose information may include determining a yaw component of the head pose based at least in part on an inner canthus and an outer canthus of the at least one eye represented by the image data, determining a roll component of the head pose based at least in part on an angle of a line extended between the inner canthus and the outer canthus of the at least one eye, and determining a pitch component of the head pose based at least in part on one or more of an upper eyelid or a lower eyelid of the at least one eye.

In some examples, the process 1000 may further include navigating on a user device based at least in part on the head pose information.

In some examples, the process 1000 may further include, prior to accessing the indication that the at least one eye is in the gaze state accessing other image data corresponding to the eye region, determining gaze information corresponding to the at least one eye based on least in part on the other image data, and determining the indication that the at least one user eye is in the gaze state based at least in part on the gaze information.

Figure 11:
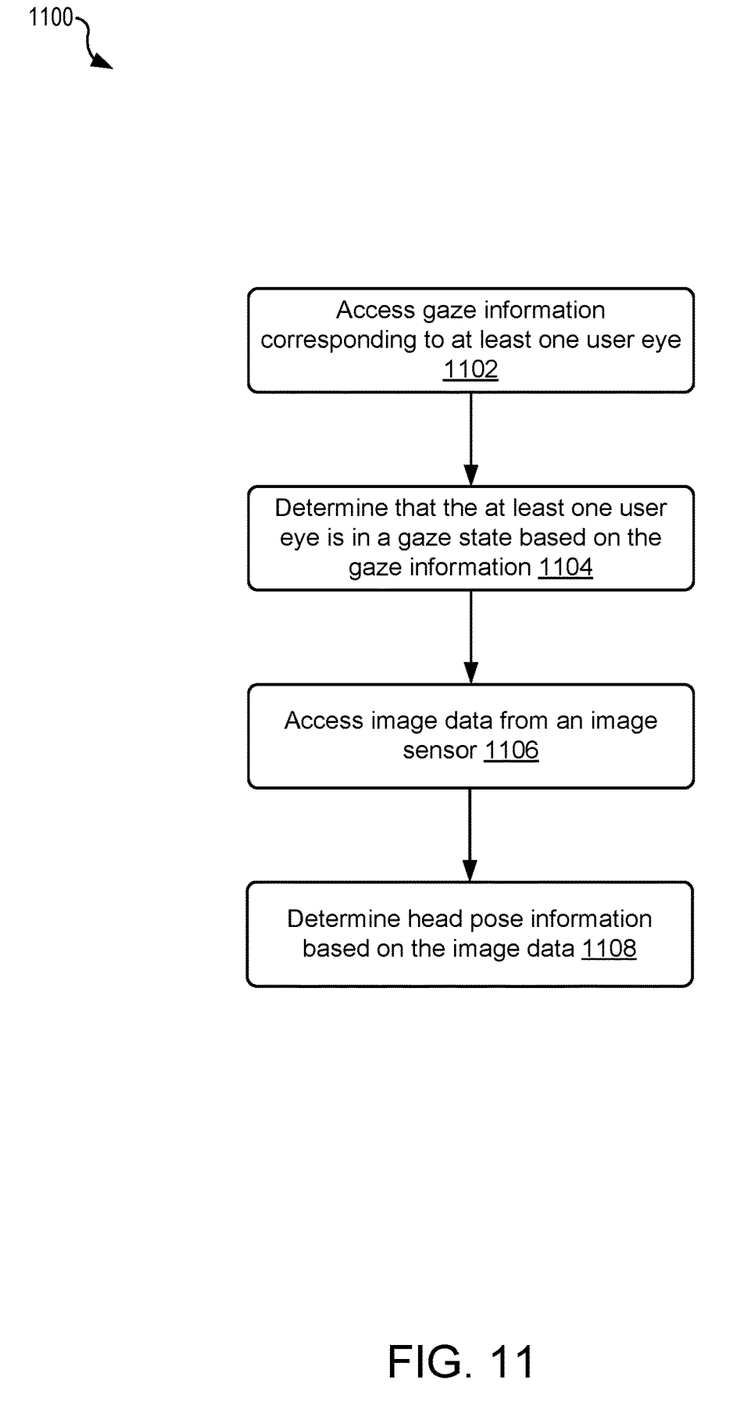
FIG. 11 illustrates an example flow diagram showing the process for determining head pose information, according to at least one example.

FIG. 11 illustrates an example flow diagram showing the process 1100 for determining head pose information, according to at least one example. The process 1100 may be performed by the user device 104, the sensor device 106, and/or the eye tracking system 700.

The process 1100 may begin at 1102 by accessing gaze information corresponding to at least one user eye.

At 1104, the process 1100 may include determining that the at least one user eye is in a gaze state based at least in part on the gaze information. In some examples, the gaze state corresponds to at least one of a gaze point of the at least one eye or a gaze vector of the at least one eye.

At 1106, the process 1100 may include accessing image data from an image sensor. This may be performed in response determining that the at least one eye is in the gaze state. The image data may correspond to an eye region that includes the at least one eye in the gaze state.

At 1108, the process 1100 may include determining head pose information based at least in part on the image data corresponding to the eye region. In some examples, the head pose information may define at least a position of a user head and an orientation of the user head.

In some examples, determining the head pose information is based at least in part on detecting one or more user eye features of the at least one eye based at least in part on the image data.

In some examples, determining the head pose information may include using an artificial intelligence technique to evaluate the image data corresponding to the eye region. The artificial intelligence technique may include a machine learning technique based at least in part on a feature vector that corresponds to eye features. The artificial intelligence technique may include a deep learning technique.

In some examples, determining the head pose information may include determining the head pose information based at least in part a particular portion of the image data that excludes a user nose tip and user ears.

In some examples, the eye region, for the at least one eye, includes eye features including one or more of an iris, a pupil, a sclera, an upper eyelid, a lower eyelid, an inner canthus, or an outer canthus. In this example, determining the head pose information may be further based at least in part on a portion of the image data that corresponds to the eye features.

In some examples, the image data is first image data. In this example, the process 1100 may further include, before accessing the gaze information, accessing second image data from the image sensor, the second image data corresponding to the eye region, and determining the gaze information based at least in part on the second image data.

Figure 12:
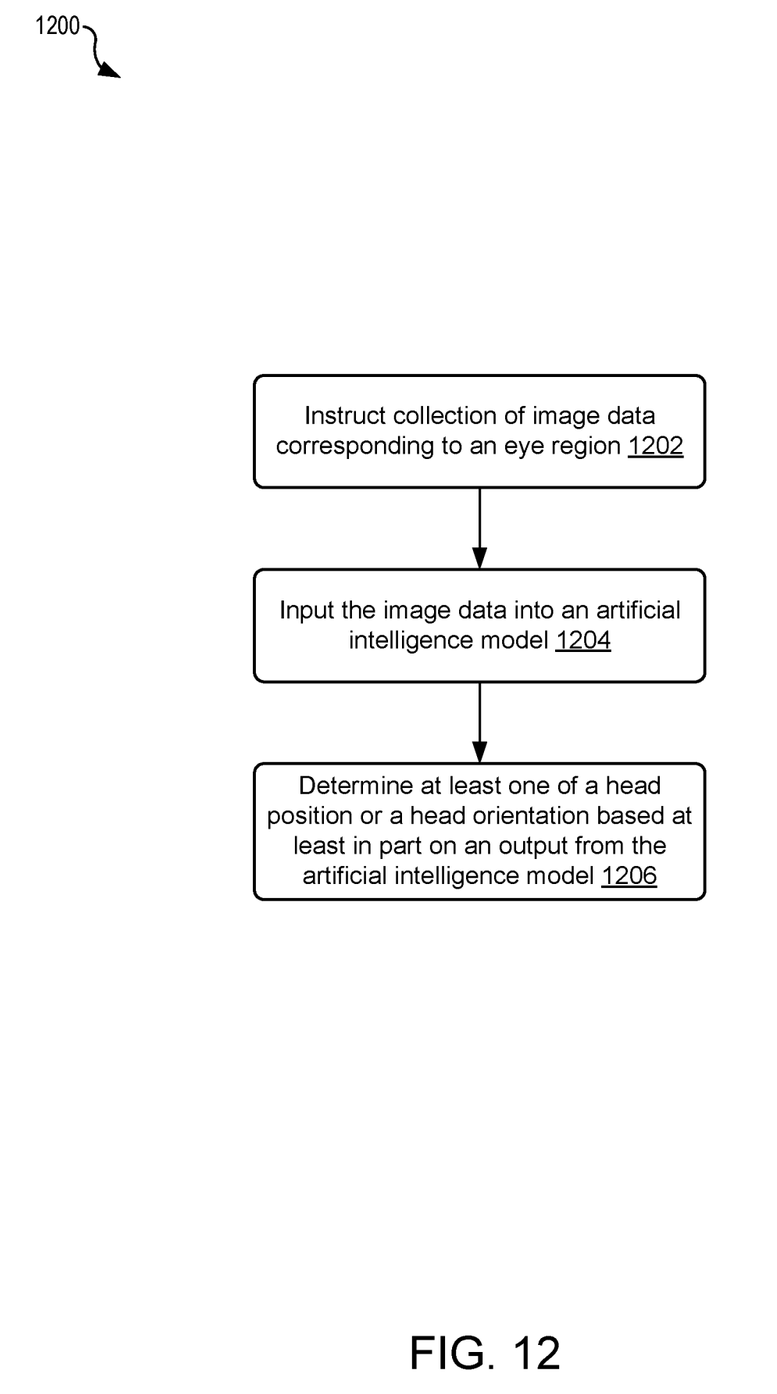
FIG. 12 illustrates an example flow diagram showing the process for determining head pose information, according to at least one example.

FIG. 12 illustrates an example flow diagram showing the process 1200 for determining head pose information, according to at least one example. The process 1200 may be performed by the user device 104, the sensor device 106, and/or the eye tracking system 700.

The process 1200 may begin at 1202 by instructing collection of image data corresponding to an eye region. The eye region may include at least one eye and, in some examples, may include two eyes. The eye region may be captured at a high resolution using an image sensor including a rolling shutter. In some examples, the image data excludes data corresponding to facial features disposed outside the eye region. For example, nose, ears, mouth, etc. conventionally used to determine head pose or head movements may be excluded from the image data.

At 1204, the process 1200 may include inputting the image data into an artificial intelligence model. For example, the image data that corresponds to the eye region can be input into a deep convolutional neural network (deep CNN). The artificial intelligence model can be trained using annotated image data corresponding to eye regions obtained with a known gaze position, a known head position, and a known head pose. The artificial intelligence model may be capable of making a number of predictions based on the image data. For example, the artificial intelligence model may determine a head position, a head orientation, an eye position, a gaze direction, and/or a gaze point based on the image data.

At 1206, the process 1200 may include determining at least one of a head position or a head orientation based at least in part on an output from the artificial intelligence model. Thus, in at least some examples, the head position and the head orientation can be determined without accessing gaze data associated with the user's eyes.

In some examples, the process 1200 may further include determining at least one of a gaze point or a gaze direction based at least in part on the output from the artificial intelligence model.

Throughout this document references have been made to an "eye tracker" or similar. Although the present disclosure has been described with reference to eye or gaze tracking, it is intended that the present disclosure function with any form of image based capture system. For example the "eye tracker" does not necessarily need to determine a user's gaze direction, but could determine just a user's facial features, expressions or even simply whether a user is present in front of a computing device.

Any reference to a "computing device" or similar is intended to include any form of computing, from desktop based personal computing, to wearable devices such as Virtual Reality or Augmented Reality headsets, to portable devices such as mobile phones or tablets.

The person skilled in the art realizes that the present disclosure is by no means limited to the preferred examples described above. On the contrary, many modifications and variations are possible within the scope of the appended claims. For example, the person skilled in the art realizes that the eye/gaze tracking methods described herein may be performed by many other eye/gaze tracking systems than the example eye/gaze tracking system 700 shown in FIG. 7, for example using multiple illuminators and multiple cameras.

Additionally, variations to the disclosed examples can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. The division of tasks between functional units referred to in the present disclosure does not necessarily correspond to the division into physical units; to the contrary, one physical component may have multiple functionalities, and one task may be carried out in a distributed fashion, by several physical components in cooperation. A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems. The mere fact that certain measures/features are recited in mutually different dependent claims does not indicate that a combination of these measures/features cannot be used to advantage. Method steps need not necessarily be performed in the order in which they appear in the claims or in the examples described herein, unless it is explicitly described that a certain order is required. Any reference signs in the claims should not be construed as limiting the scope.

What is claimed is:

1. A sensor device, comprising:
an image sensor;
a memory configured to store computer-executable instructions; and
a processor in communication with the memory and configured to execute the computer-executable instructions to at least:
access gaze information corresponding to at least one user eye;
determine that the at least one user eye is in a gaze state based at least in part on the gaze information;
in response determining that the at least one eye is in the gaze state, access image data from the image sensor, the image data corresponding to at least an eye region that includes the at least one eye in the gaze state; and
determine head pose information based at least in part on the image data corresponding to the eye region, the head pose information defining at least a position of a user head and an orientation of the user head.

2. The sensor device of claim 1, wherein determining the head pose information is based at least in part on detecting one or more user eye features of the at least one eye based at least in part on the image data.

3. The sensor device of claim 1, wherein the gaze state corresponds to at least one of a gaze point of the at least one eye or a gaze vector of the at least one eye.

4. The sensor device of claim 1, wherein determining the head pose information comprises using an artificial intelligence technique to evaluate the image data corresponding to the eye region.

5. The sensor device of claim 4, wherein the artificial intelligence technique comprises a machine learning technique based at least in part on a feature vector that corresponds to eye features.

6. The sensor device of claim 4, wherein the artificial intelligence technique comprises a deep learning system that receives the image data as input and outputs the head pose information.

7. The sensor device of claim 1, wherein determining the head pose information based at least in part on the image data corresponding to the eye region comprises determining the head pose information based at least in part on a particular portion of the image data that excludes a user nose tip and user ears.

8. The sensor device of claim 1, wherein:
the eye region, for the at least one eye, comprises eye features comprising one or more of an iris, a pupil, a sclera, an upper eyelid, a lower eyelid, an inner canthus, or an outer canthus; and
determining the head pose information is further based at least in part on a portion of the image data that corresponds to the eye features.

9. The sensor device of claim 1, wherein:
the image data is first image data; and
the processor is further configured to access the computer-executable instructions to at least:
before accessing the gaze information, access second image data from the image sensor,
the second image data corresponding to the eye region; and
determining the gaze information based at least in part on the second image data.

10. One or more non-transitory computer-readable storage devices storing computer-executable instructions that, when executed by one or more computer systems, cause the one or more computer systems to perform operations comprising:
instructing collection of image data corresponding to an eye region that includes at least one eye of a user;
inputting the image data into an artificial intelligence model; and
determining at least one of head position or a head orientation based at least in part on output from the artificial intelligence model;
wherein the operations further comprise determining at least one of a gaze point or a gaze direction based at least in part on the output from the artificial intelligence model.

11. The one or more non-transitory computer-readable storage devices of claim 10, wherein the artificial intelligence model is trained using annotated image data corresponding to eye regions obtained with a known gaze position, a known head position, and a known head pose.

* * * * *